Aug. 12, 1952 R. E. DIETERICH 2,606,788
PILLAR MOUNTING BRACKET FOR AUTOMOBILE VISORS
Filed June 2, 1950 3 Sheets-Sheet 1
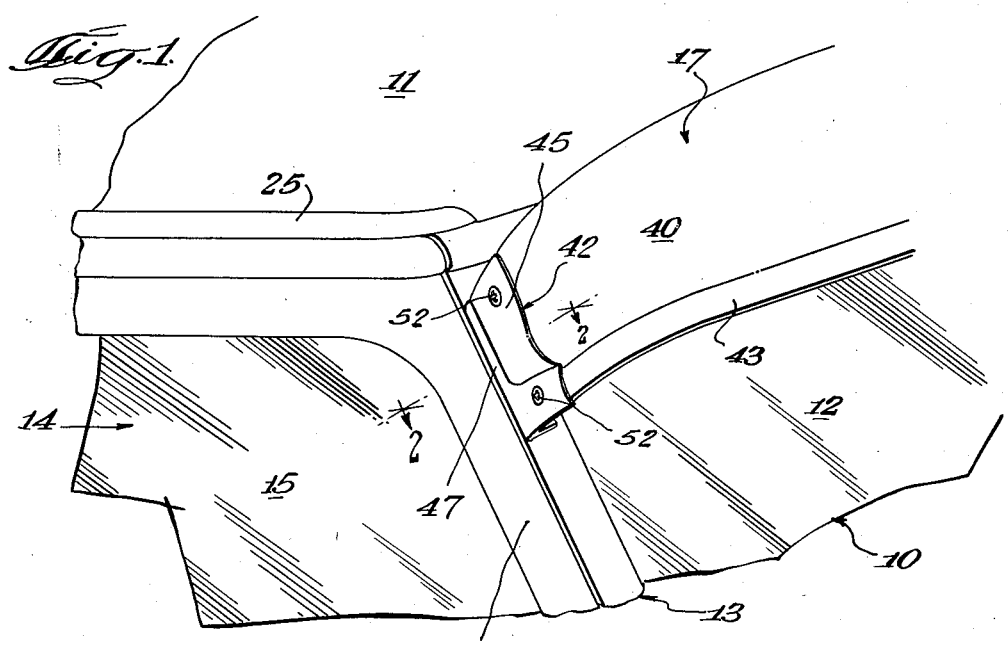
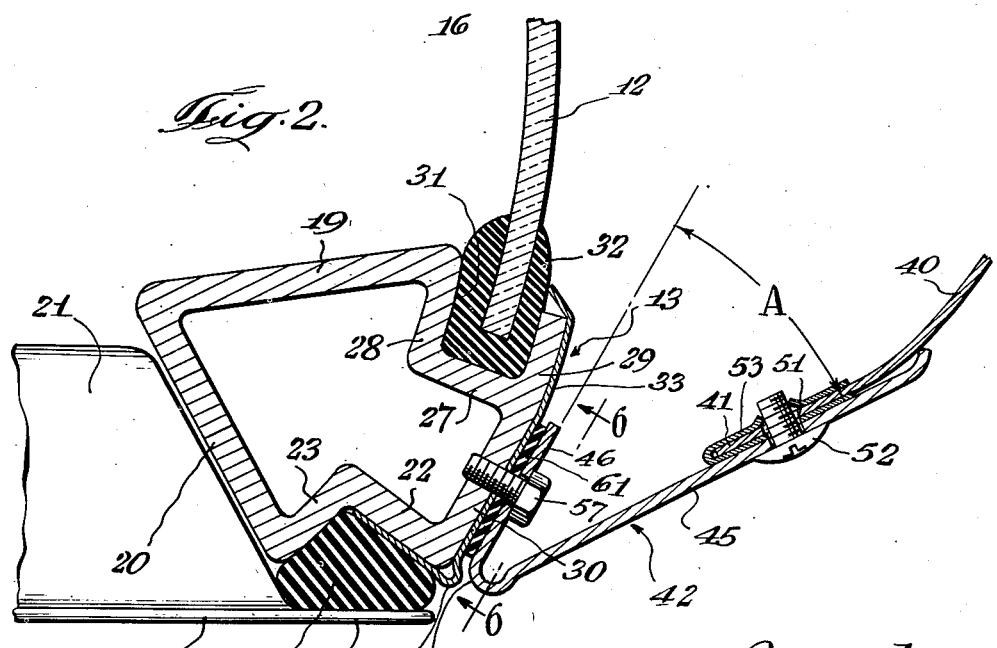
Inventor:
Richard E. Dieterich
By J. Irving Silverman
Attorney

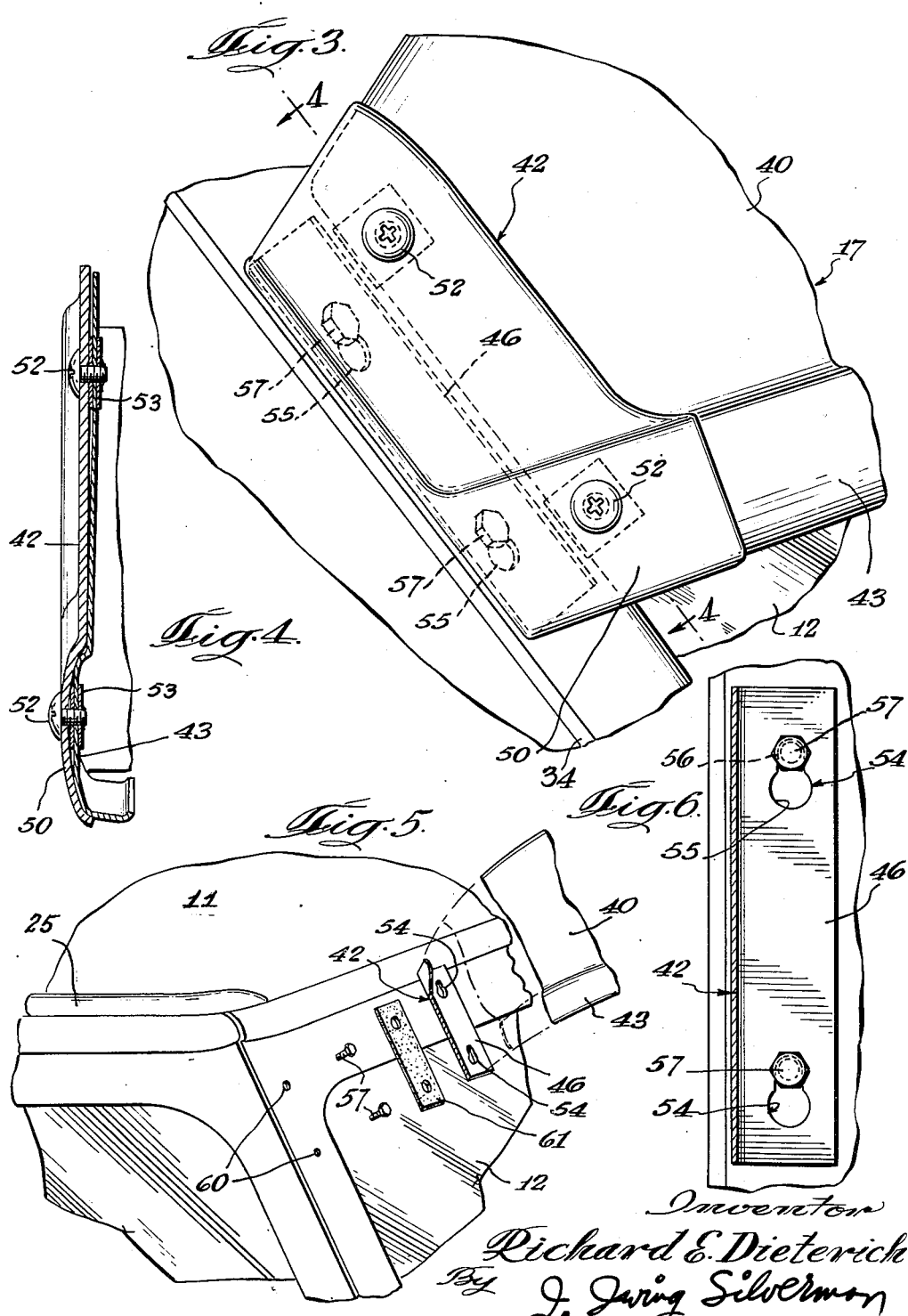

Aug. 12, 1952   R. E. DIETERICH   2,606,788
PILLAR MOUNTING BRACKET FOR AUTOMOBILE VISORS
Filed June 2, 1950   3 Sheets-Sheet 3

Inventor
Richard E. Dieterich
By I. Irving Silverman
Attorney

Patented Aug. 12, 1952

2,606,788

UNITED STATES PATENT OFFICE 2,606,788

PILLAR MOUNTING BRACKET FOR AUTOMOBILE VISORS

Richard E. Dieterich, Park Ridge, Ill., assignor to Dieterich Products Corporation, Michigan City, Ind., a corporation of Illinois Application June 2, 1950, Serial No. 165,855

3 Claims. (Cl. 296—95)

This invention relates generally to exterior automobile visor mounting means and more particularly is directed to a bracket which is specifically intended to enable the automobile visor to be secured to the posts or pillars alongside the automobile windshield.

The recent trend of modern automobile body design has been towards streamlining and greater visibility, especially for the driver, and the result has been that the windshields of modern automobiles are constructed with great convexity. In addition to this constructional feature, the posts or standards which support the automobile top, and especially those which are provided for the support of the windshield have become smaller in cross sectional area. The windshield posts will be termed pillars herein, since they are the most important of the standards, it being possible in the case of some models such as convertibles, to eliminate all but the windshield pillars.

Until the advent of the sloped windshield, it was customary to secure exterior automobile visors by fastening same to the windshield pillars in any suitable manner such as by clamps or by screws. After the advent of the sloped windshield it became most desirable to secure the visors by clamps alone, because then the automobile gutters were carried down alongside the windshield and it was obvious to clamp the visors to the gutter. Others suggested the provision of brackets which entered the door openings and were secured to the frame of the automobile thereat.

With present automobile construction, the rain gutters that are provided along the automobile roofs no longer extend down the windshield pillars. Such gutter extensions have been found unnecessary or undesirable. The space available between the doors and the windshield pillars is not always sufficient to permit the use of brackets having parts which extend into such space. Such brackets are undesirable as well because they interfere with proper operation of the door and necessitate disturbing the weather stripping in order to attach the same.

One of the principal objects of the invention is therefore to provide visor supporting brackets for mounting the visor in proper shading relationship to the automobile windshield which brackets will be extremely simple in conistruction and which will be adapted to be secured to the automobile windshield pillars.

Other objects of the invention are to provide a construction which will completely hide the attaching means so that there will be no unsightly screws or bolts visible to mar the appearance of the automobile; to provide a bracket which requires very little securing space on the windshield pillars and yet which will provide greater engaging surface than heretofore possible; to provide a bracket which will rigidly support the visor without any danger of it coming loose or flying off, and yet which will permit ready removal of the visor in an exceedingly short time if desired; to provide a visor supporting bracket of highly simplified design and which can be made easily and cheaply.

In connection with another important object of the invention presently to be set forth, due to the great convexity of the present automobile windshields, it is required of the properly positioned exterior visor that same have great convexity as well. Such visor is spaced from the windshield, but must meet the automobile at the pillars alongside of the windshield. Obviously, the angle of such meeting is quite acute, and in some cases may run as little as 25°. An important object of the invention is to provide a bracket enabling the attachment of the visor ends to the pillars by fastening means accessible from the inside of the bracket in said acute angle.

With the foregoing and many other objects which will appear as the description proceeds, the invention consists of certain novel features of construction, arrangement and a combination of parts hereinafter fully described, illustrated in the accompanying drawings, and particularly pointed out in the appended claims, it being understood that various changes may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a fragmentary perspective view of the right hand side of an automobile body having a visor secured alongside the windshield thereof and utilizing brackets for the attachment thereof which brackets are constructed in accordance with the invention.

Fig. 2 is a sectional view taken through the windshield pillar, the bracket and the visor along the line 2—2 of Fig. 1 but on a greatly enlarged scale.

Fig. 3 is a side elevational view showing the bracket secured to the windshield pillar.

Fig. 4 is a sectional view taken through the bracket along the line 4—4 of Fig. 3 and in the indicated direction.

Fig. 5 is an exploded perspective view showing the parts of the bracket and the manner of assembling same to the pillar.

Fig. 6 is a sectional view taken along the line 6—6 of Fig. 2 and in the indicated direction.

Figure 7:
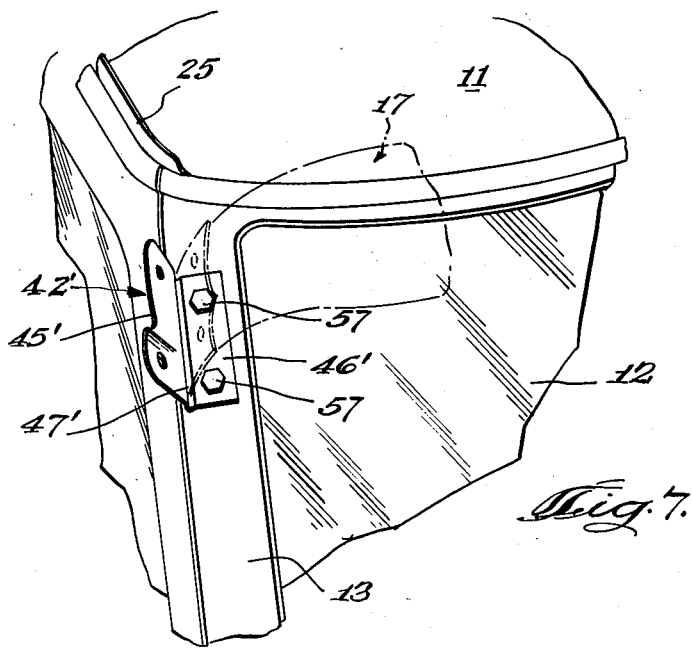
Fig. 7 is a perspective view similar to Fig. 1, but showing a modified form of the invention.

At the outset it is important to emphasize that the brackets of the invention herein are capable of being used with practically any construction of automobile. The pillars may or may not have rain gutters thereon, may or may not have great slope, and the windshield may or may not have great convexity. The brackets of the invention will securely and safely support an automobile visor from any of these constructions, as well as from the modern type of automobile whose windshield pillars have no gutters and in which the angle between visor and pillar face will of necessity be very acute. As to this latter type of construction, it is believed that no bracket has heretofore been devised capable of being used therewith in the manner to be set forth.

In Fig. 1 there is shown a streamlined modern automobile 10 having a roof 11, a sloped convex windshield 12 set into pillars on opposite sides of the automobile 10 which support the roof 11. The right hand pillar is the only one shown in the drawings and same is designated generally by the reference character 13. There is also shown in Fig. 1 a door 14 having a door window 15, and a door frame member 16 adapted to engage against the pillar 13 in any suitable manner. A curved elongate visor 17 is arranged in shading relationship to the windshield 12 and is supported from the pillars in a novel manner to be described.

The exact construction of the pillar 13 is of no great importance insofar as the invention is concerned, and hence the description thereof which follows is not to be considered limiting in nature but merely explanatory in order to clarify the exact nature of the invention. The pillar includes a hollow standard 19 which may be formed of steel or some such material having great strength. As shown in Fig. 2, the standard 19 has a symmetrical cross sectional configuration. The rear thereof (with reference to the normal forward direction of motion of the automobile) is somewhat triangular and one of the faces 20 serves as a part of the door opening, an inner portion 21 of the door frame 16 is adapted to be juxtaposed relative thereto. The forward portion of the standard 19 is generally rectangular in cross section, as shown in the said Fig. 2. The wall 22 in cooperation with the wall portion 23 forms a groove in which the rubber weather stripping 16 has a flanged edge 26 which substantially covers this groove and presses against the weatherstripping 24 therein.

It will be noted that the roof 11 is bordered by a gutter member 25 which stops short of the front of the automobile and hence the pillar 13 is devoid of any gutter construction.

The wall 27 cooperates with wall portion 28, and an extension 29 of the front wall 30 to form a rectangular groove 31 within which there is engaged the rubber supporting member 32 within which the edges of the windshield 12 are held. It will be noted that there is a sheet metal trim member 33 which extends from the face of the member 22 outwardly, has a trim bead at 34 and extends across the face of the forward wall 30 and over the extension 29. This trim member is not essentially a part of the pillar 13 and is merely for enabling chromium plated ornamentation to be applied. It may be a part of a windshield framing member. For the purpose of this invention it may be considered that the wall 30 is the forward surface of the pillar 13.

The construction thus far described is not intended to be covered by this invention. It is considered as ordinary practise in automobile body construction and has been presented to illustrate the type of automobile body with which the invention is adapted best to be associated. The principal features of the construction as described are that there is a windshield supporting pillar 13 which has a forwardly facing surface 30 to which the brackets of the visor are adapted to be secured. Although not necessarily a requirement of the construction, a noteworthy characteristic of the described automobile body is that the windshield is greatly convex, that is to say, bowed outwardly, so that the angle subtended between the forwardly facing surface 30 of the windshield supporting pillar 13 and the end of the visor 17 is acute, making it extremely difficult to fasten the visor thereat by means of fastening contrivances accommodated in the said acute angle.

The visor 17 is constructed in a manner providing elongate sheet metal panels, the right hand one 40 of which is adapted to have its free end 41 attached to the pillar 13 by means of the bracket which is designated generally by the reference character 42. The particular visor shown has its leading edge formed with a channel shaped crimp 43 which may be chromium plated for ornamental purposes. The trim crimp 43 may even be a separate member secured to the visor panel 40.

The bracket 42 is preferably formed of relatively heavy gauge sheet metal, and consists principally of two relatively planar plate-like portions 45 and 46 conjoined along a bend 47 which may be in the form of a bead as best illustrated in Fig. 1. The two plate like portions 45 and 46 will hereinafter be termed wings, and same are arranged relative to one another to form an acute angle which is indicated in Fig. 2 by the letter A. This is the angle that must exist between the front surface of the pillar 13 and the end of the visor 17 in order for the visor to be attached to the automobile 10 in proper shading relationship to the windshield 12. The wing 46 is adapted to be engaged flatly against the face of the wall 30 (with the chromium plated trim member 33 sandwiched in between) and secured thereto in some manner. It should be appreciated that it is impossible to use removable fastening means such as screws or bolts which are to be inserted from the inside of the angle A and driven through the wing 46 and into the pillar 13 without providing some openings in the wing 45 through which the tools and the fastening means could be inserted. The angle A in most cases is quite small unless it is intended that the bracket wing 45 extend at substantially right angles to the face of the wall 30. The visor 17 would thereby be required to stand off from the windshield an undesirable amount.

The invention contemplates that the bracket 42 be secured from the inside of the angle A by means of bolts or screws which will not be visible from the outside of the bracket so as to render the automobile unsightly in appearance. Certain constructional features make this possible as will presently be pointed out.

The bracket of the invention is intended to be removably attached to the end 41 of the visor panel 40 although it is within the scope of the invention to form the entire bracket 42 on the end of the panel 40 and integral therewith so that no means for securing the bracket to the panel end 41 are required. In the illustrated construction, the bracket 42 has an upset formation 50 at the front thereof which is of a size and shape to conform to the trim bead 43 of the visor 17. That portion of the trim bead 43 at the end 41 will nest into the bottom of the formation 50 and thereby enable the ornamentation of the bracket 42 to blend with that of the visor 17. Any other suitable ornamentation can of course be used. The end 41 has suitable holes 51 which may be slotted, and said holes are adapted to align with the screws 52 which pass through the wing 45 and through the end 41. Suitable nuts are provided for enabling the screws 52 to be driven home for drawing the wing 45 to the end 41 of the panel 40. Such nuts may be sheet metal punch nuts 53 of any desired type, such as those illustrated which are in the form of a strip of metal folded upon itself and adapted to be engaged upon the end 41 and having an opening on one side and the punched outward prongs on the other side.

In the embodiment illustrated in Figs. 1 through 6, the wing 46 is provided with slots 54 of general keyhole shape and each having a large portion 55 and a narrow portion 56. The slots 54 are of a size to accommodate the headed screws 57 which are intended to be screwed into appropriately tapped holes 60 in the pillar 13 in the manner shown in Fig. 2 for holding the bracket 42 firmly to the face of the wall 30. The diameter of the portions 55 is greater than the diameter of the head of the screws 57 and the diameter of the portion 56 is greater than the shank of the screws 57. The narrow portions 56 of the slots 54 are arranged uppermost so that when the visor 17 is mounted upon the automobile 10, the weight of the visor will tend to force the shanks of the screws 57 into the narrow portions 56 and thereby the heads of the screws will prevent the bracket 46 from being pulled outwardly away from the pillar 13.

The bracket 42 is secured to the pillar 13 in the following manner. The holes 60 are first drilled and tapped at the proper location, and then the screws 57 are screwed into the holes with a strip 61 of some resilient material such as rubber mounted thereon. The heads of the screws 57 are permitted to protrude a distance outwardly which is substantially greater than the thickness of the wing 46. Although not here shown, it is of course intended that brackets be secured to both the right and left windshield supporting pillars, and hence the holes for the left hand side of the visor 17 are also drilled and screws mounted therein. The left hand side of the visor 17 will have a bracket identical in construction to the bracket 42, but oppositely formed.

When the screws 57 have been properly placed, the bracket 42, either alone, or already secured to the visor panel 40, may be poised over the heads of the screws 57 with the larger openings 55 of the wing 46 aligned with said heads. Then the bracket 42 is pushed against the pillar 13 causing the heads of the screws 57 to enter the openings 55, and thereafter the entire bracket is slid downwardly so that the heads of the screws 57 engage over the edges of the narrow portions 56 of the slots 54 while the shanks of the screws enter said narrow portions. It should be appreciated that there is sufficient clearance for the screw heads in the angular space between the wings 45 and 46 because only a fraction of the screw protrudes, the major portion being already embedded in the wall 30. Thereafter, it is a simple matter to apply a wrench to the screw heads from the inside of the visor 17 and tighten same to the condition illustrated in Fig. 2, with the resilient member 61 keeping the connection weather tight. Thus, not only are the screws 57 tightly engaged in the pillar 13, but, even if they should work loose, the formation of the keyhole shaped slot 54 is such that it is unlikely that the bracket 42 will fall off.

The above described embodiment of the invention provides novel means for securing the visor to the automobile in a manner which does not require bending or flexing of the bracket during installation. Thus the bracket and its wings 45 and 46 may be formed of relatively stiff material or may even be cast or forged. Such flexing as may be required is a minimum for adjustment of the angle A for the various models of automobiles. The provision of bead 47 of relatively greater curvature than would be achieved if the metal wings 45 and 46 were merely bent or folded during manufacture enables such flexure without danger of breaking, although in some cases such a bead may merely be ornamental. Another feature of the above described embodiment is that the fastening means, namely the screws 57 are completely hidden by the bracket wing 45 and not seen from the outside of the visor 17. The attachment is therefore neat and does not mar the appearance of the automobile.

In Fig. 7 there is illustrated a modified form of the invention which utilizes a bracket 42′ substantially the same as that previously described except that the bead 47′ is intended to serve as a hinge about which the wing 45′ may bend in the manner shown by the dotted lines. The wing 46′ is fastened to the pillar 13 by screws 57 but there are no keyhole shaped slots in the wing 46′ as there were in the wing 46. Instead, only conventional holes are provided and the bracket 42′ is securely fastened to the pillar 13 before the visor panel 40 of visor 17 is attached thereto. The bracket 42′ is formed with the angle A between the two wings of sufficient extent to permit the screws 57 to be mounted and driven into the pillar 13. Thereafter, the wing 46′ is seized and bent about the bead 47′ into the position forming the necessary acute angle in the manner illustrated by the broken lines in Fig. 7. Following this the end 41 of the visor panel 40 is secured thereto. This modified form of the invention does not permit the brackets and visor to be formed as an integral unit if desired and further requires separation of the visor panel 40 from the brackets before assembly.

Figure 8:
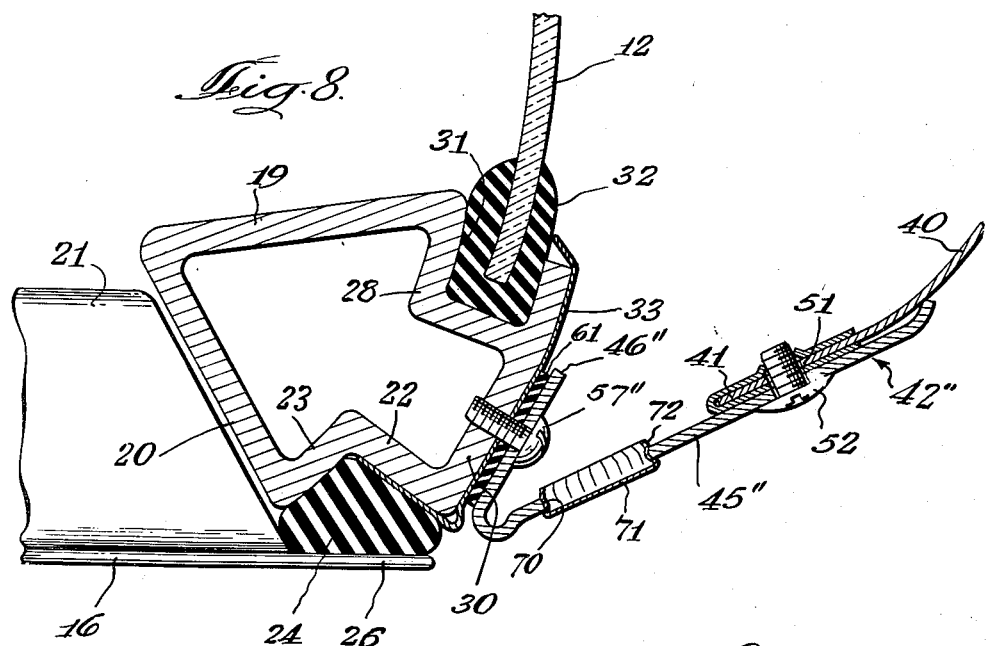
Fig. 8 is a view similar to that of Fig. 2 but showing a still further modified form of the invention.

The further modification of the invention illustrated in Fig. 8 utilizes a bracket 42″ which is constructed substantially like the bracket 42 except that there are no keyhole shaped slots in the wing 46″. Instead, the wing 45″ is provided with pilot opening 70 aligned with the tapped holes 60 of the pillar 13, so that the screws 57″ can be inserted into the holes 60 through the outside of the bracket 42″ through these pilot openings 70. Thereafter, an appropriate tool such as a screw driver can also be inserted through the openings 70 to drive the screws 57″ home. If desired, the pilot openings may be covered with ornamental plates 71 held in position by any appropriate means such as for example spring fingers 72 engaging the openings 70 in the wing 45″. Any suitable cover plates or plugs are capable of being used to hide the pilot openings 70.

It will be seen that there has been provided a bracket construction which will enable automobile visors to be secured to windshield pillar posts in a manner providing safe, efficient, and positive support. The invention is capable of wide variation in the details of size, shape of parts, and unimportant elements such as ornamentation without departing from the spirit of the invention. It is intended only to be limited in scope only by the breadth of the claims appended hereto.

What it is desired to claim is:

1. In a visor of the character described which is generally convex in configuration and which is adapted to have its ends secured to the windshield supporting pillars of an automobile in shading relationship to the windshield, said ends meeting said pillars at a substantially acute angle with the windshield, a bracket for securing each of said ends to the pillars, one of said brackets adapted to be provided on each end of the visor, each bracket comprising a pair of wings arranged at an acute angle one with respect to another and joined along a fold having a bead therealong, means enabling one wing to be secured to a visor end, with the apex of the angle arranged away from said visor, said second wing adapted to be engaged against the said pillar, and means for enabling said second wing to be secured to the said pillar, said last mentioned means including at least one slot having a narrow and a wide portion, and adapted to receive therein a screw having a head larger than the wide portion but wider than the narrow portion, whereby the screw partially may be driven into the pillar, the said wing mounted on the screw over the head thereof, and thereafter slid so that the head engages over the narrow portion, whereby said screw may thereafter be finally driven into said pillar to hold said second wing thereto, the wider portion of said slot being arranged downwardly relative to the narrow portion whereby the weight of the visor will urge the screw into the narrow part, said slot being located beneath and concealed by the said one wing.

2. A bracket for securing a visor to the front surfaces of a pair of windshield supporting pillars arranged on opposite sides of an automobile windshield in shading relationship thereto which comprises a pair of wings, one adapted to be secured to the end of the visor for forming substantially an extension thereof, the second wing meeting the first wing along a fold having a bead of greater curvature than said fold adapted to extend parallel with one of said pillars, and said second wing adapted to be engaged against the front surface of said pillar and secured thereto, said second wing forming an acute angle with the first wing, said bracket adapted to be attached to the said pillar by fastening elements passing through the said second wing from the inside of the said angle, and said second wing having keyhole shaped slotted openings therein to enable the same to be hooked onto fastening elements previously partially driven into the pillars so that the angle will readily accommodate that portion of the elements protruding and enable the elements to be driven home thereafter, said slotted openings being located beneath the confines of the said one wing whereby said one wing conceals same and blocks normal access for fastening members to be inserted through said openings from the inside of said acute angle outward for driving said fastening members into one of said supporting pillars.

3. A bracket for supporting an elongate visor in shading relationship to the windshield of an automobile, said automobile having windshield supporting pillars adjacent the windshield on opposite sides thereof and each pillar having a forwardly facing surface, and said bracket adapted to be secured to said surface by a headed screw, said bracket comprising a pair of wings arranged at an acute angle one with respect to the other and joined along a fold, means enabling one wing to be secured to an end of said visor to form a continuum thereof, the second wing adapted to be engaged against said pillar, and means for enabling said second wing to be secured to the said pillar including a keyhole-shaped slot in said second wing adapted to receive the head of the screw in the larger portion of the slot and the shank of the screw in the narrow portion of the slot, whereby the bracket may be loosely engaged upon the partially driven home screw, slid to a position with the head over the narrow portion of the slot, and then tightly secured by driving the screw all the way home, said slot being located directly beneath and concealed by the said one wing whereby normal insertion of said screw from the inside of said acute angle is prevented.

RICHARD E. DIETERICH.

REFERENCES CITED

The following references are of record in the file of this patent:

UNITED STATES PATENTS

| Number | Name | Date |
| --- | --- | --- |
| 1,644,662 | Anderson | Oct. 11, 1927 |
| 2,095,653 | Tepel | Oct. 12, 1937 |
| 2,511,401 | Ellithorpe | June 13, 1950 |
| 2,581,610 | Smith et al. | Jan. 8, 1952 |